US012811020B2

(12) United States Patent
Hamamoto

(10) Patent No.: US 12,811,020 B2
(45) Date of Patent: Nov. 24, 2026

(54) NUCLEAR REACTOR SYSTEM

(71) Applicant: BLOSSOM ENERGY, INC., Tokyo (JP)

(72) Inventor: Shimpei Hamamoto, Tokyo (JP)

(73) Assignee: BLOSSOM ENERGY, INC., Tokyo (JP)

( * ) Notice: Subject to any disclaimer, the term of this patent is extended or adjusted under 35 U.S.C. 154(b) by 0 days.

(21) Appl. No.: 18/874,356

(22) PCT Filed: Jun. 8, 2023

(86) PCT No.: PCT/JP2023/021275
§ 371 (c)(1),
(2) Date: Dec. 12, 2024

(87) PCT Pub. No.: WO2023/243524
PCT Pub. Date: Dec. 21, 2023

(65) Prior Publication Data

US 2025/0259760 A1 Aug. 14, 2025

(30) Foreign Application Priority Data

Jun. 14, 2022 (JP) ................................ 2022-095530

(51) Int. Cl.
*G21D 1/00* (2006.01)
*G21C 13/024* (2006.01)
*G21C 19/303* (2006.01)

(52) U.S. Cl.
CPC ............ *G21D 1/00* (2013.01); *G21C 13/024* (2013.01); *G21C 19/303* (2013.01)

(58) Field of Classification Search
CPC ...... G21C 13/024; G21C 15/12; G21C 15/18; G21C 19/28; G21C 19/30; G21C 19/303; G21D 1/00; G21D 1/02
USPC ................................ 376/282, 311, 461, 911
See application file for complete search history.

(56) References Cited

U.S. PATENT DOCUMENTS 4,610,841 A * 9/1986 Yamada .............. G21C 19/303
976/DIG. 267
6,327,323 B1 12/2001 Rohde et al.
2020/0005950 A1 1/2020 Florido et al.
2022/0270770 A1* 8/2022 Ganesan ............... G21C 9/001

FOREIGN PATENT DOCUMENTS

JP S62289794 A 12/1987
JP S64015999 U 1/1989
JP H04127083 A * 4/1992
JP H10115692 A 5/1998
(Continued)

OTHER PUBLICATIONS

English Translation of International Preliminary Report on Patentability in corresponding application PCT/JP2023/021275 dated Jul. 31, 2024. (Year: 2024).*

(Continued)

*Primary Examiner* — Jinney Kil
(74) *Attorney, Agent, or Firm* — McDonald Hopkins LLC

(57) ABSTRACT

The system comprises a plurality of nuclear reactors that use coated fuel particles, a moderator and a coolant, a steam generator, and a steam turbine in communication with the steam generator, with the plurality of nuclear reactors being connected to one of the steam generators.

8 Claims, 9 Drawing Sheets

(56) References Cited

FOREIGN PATENT DOCUMENTS

| | | | | | |
|---|---|---|---|---|---|
| JP | 2010037789 | A | | 2/2010 | |
| JP | 2012202510 | A | | 10/2012 | |
| JP | 2019015397 | A | * | 1/2019 | |
| KR | 100871284 | B1 | | 11/2008 | |
| KR | 20110090276 | A | * | 8/2011 | ............. G21D 1/006 |
| KR | 101654107 | B1 | | 9/2016 | |
| KR | 20220067260 | A | | 5/2022 | |

OTHER PUBLICATIONS

Zhang, Zuoyi, et al. "Current status and technical description of Chinese 2x 250 MWth HTR-PM demonstration plant." Nuclear Engineering and Design 239.7 (2009): 1212-1219. (Year: 2009).*

International Search Report in corresponding application PCT/JP2023/021275 dated Jul. 11, 2023.

Written Opinion of the International Searching Authority in corresponding application PCT/JP2023/021275 dated Jul. 11, 2023.

Written Opinion of the International Preliminary Examining Authority in corresponding application PCT/JP2023/021275 dated May 7, 2024.

International Preliminary Report on Patentability in corresponding application PCT/JP2023/021275 dated Jul. 31, 2024.

Notice of Allowance in corresponding application JP 2022-095530 dated Nov. 27, 2024.

Tanaka Toshiyuki, et al., 322. Performance Test of the High Temperature Engineering Test Reactor (HTTR), Journal of the Atomic Energy Society of Japan, vol. 41, No. 6 (1999), 1999, https://www.jstage.jst.go.jp/article/jaesj1959/41/6/41_6_686/_pdf.

Takamatsu Kuniyoshi, et al., High-Temperature Continuous Operation of the high temperature engineering test reactor (HTTR), Transactions of the Atomic Energy Society of Japan (2011), 2011, https://www.jstage.jst.go.jp/article/taesj/advpub/0/advpub_J11.020/_pdf.

Status report 96—High Temperature Gas Cooled Reactor—Pebble-Bed Module (HTR-PM), Oct. 8, 2011, https://aris.iaea.org/PDF/HTR-PM.pdf.

Zhang/Zuoyi, The Status of HTR-PM, a 200MWe High Temperature Gas-cooled Reactor demonstration plant constructed in China, Oct. 30, 2017, https://www.iaea.org/sites/default/files/17/11/cn-247-zhang.pdf.

Kunitomi et al., Structural Design of Intermediate Heat Exchanger of High Temperature Engineering Test Reactor, Journal of Atomic Energy Society of Japan, 1995, vol. 37, No. 4, p. 54-64.

Xiaotian Li et al., Safety Analysis For Hot Gas Duct Vessel In Htr-Pm, Nuclear Technology, Apr. 2011, vol. 174 vol. 174, p. 29-40.

Ohashi et al, Conceptual Design of a Small High Temperature Gas Reactor for Developing Countries, FAPIG, Feb. 2016, No. 191, p. 9-17.

European Search Report for Application 23823816.6, PCT/JP2023021275, dated Sep. 18, 2025, 36 pgs., European Patent Office, Germany.

Brazil Office Action issued in Brazil Patent Application No. BR112024025199-3 dated Jul. 24, 2025 with Partial English translation.

Notice of Allowance in corresponding Korean Application No. 10-2024-7040797, dated May 26, 2025.

Philippines Office Action issued in Philippines Patent Application No. 1/2024/552929 dated Jul. 3, 2025.

* cited by examiner

NUCLEAR REACTOR SYSTEM

TECHNICAL FIELD

The present invention relates to a nuclear reactor system.

BACKGROUND ART

Conventionally, various nuclear power plants have been developed. For example, Patent Document 1 describes a nuclear power plant having a plurality of reactors installed on a site, the nuclear power plant including a plurality of reactor vessels each housing a plurality of reactor cores therein, a plurality of reactor containment vessels each housing a plurality of reactor vessels therein, and a reactor building housing all of the plurality of reactor containment vessels therein, the horizontal cross-sectional shape of the reactor building being approximately circular or approximately square.

Citation List

Patent Literature

Patent Literature 1: JPH10-115692

SUMMARY OF INVENTION

Means for Solving the Problem

A nuclear reactor system according to a 1st aspect of the present invention, comprising:

- a plurality of nuclear reactors that use coated fuel particles, a moderator and a coolant;
- a steam generator that generates steam from thermal energy extracted from the nuclear reactors; and
- a steam turbine that is connected to the steam generator and converts the energy of the steam into rotational energy,
- wherein the plurality of nuclear reactors are connected to the one steam generator.

A nuclear reactor system according to a 2nd aspect of the present invention, in the 1st aspect of the present invention, wherein pipes extend horizontally radially from the steam generator, and the end of the pipes is connected to the nuclear reactor.

A nuclear reactor system according to a 3rd aspect of the present invention, in the 1st aspect of the present invention, wherein the pipe extending from the steam generator branches off along the way, and each of the branches is connected to the reactor.

A nuclear reactor system according to a 4th aspect of the present invention, in any one of the 1st to 3rd aspect of the present invention, wherein each of the multiple reactors and the steam generator are connected by double pipe,

- the double pipe is composed of an inner tube and an outer tube that covers the inner tube at intervals in the circumferential direction, and high-temperature gas passing from the nuclear reactor to the steam generator passes through the inner tube, and low-temperature gas returning from the steam generator to the nuclear reactor passes through the outer tube.

A nuclear reactor system according to a 5th aspect of the present invention, in any one of the 1st to the 4th aspect of the present invention, wherein all or either of the nuclear reactor and the steam generator are supported from below by a structure that allows for horizontal thermal expansion.

A nuclear reactor system according to a 6th aspect of the present invention, in the 5th aspect of the present invention, wherein the structure that allows for horizontal thermal expansion is a free ball bearing.

A nuclear reactor system according to a 7th aspect of the present invention, in any one of the 1st to 6th aspect of the present invention, wherein the reactor and/or the steam generator are supported by a support structure that suppresses vibrations caused by earthquakes.

A nuclear reactor system according to a 8th aspect of the present invention, in the 7th aspect of the present invention, wherein the support structure is a damper.

A nuclear reactor system according to a 9th aspect of the present invention, in the 1st to 8th aspect of the present invention, wherein the nuclear reactor and the steam generator are disposed on a first level, and the steam turbine is disposed on a second level above the first level.

A nuclear reactor system according to a 10th aspect of the present invention, in any one of the $1^{st}$ to 9th aspect of the present invention, wherein further comprising:

- a coolant purification facility that purifies the coolant and cools it;
- a suction pipe that connects the plurality of reactors to the suction port of the coolant purification facility; and
- a discharge pipe that connects the plurality of reactors to the discharge port of the coolant purification facility,
- wherein, if the reactors cannot be cooled normally, the coolant is cooled through the coolant purification facility, and the cooled coolant is supplied again to the reactors.

An nuclear reactor system according to a 11th aspect of the present invention, in any one of the $1^{st}$ to 10th aspect of the present invention, wherein the nuclear reactor is a gas-cooled reactor.

Advantageous Effects of Invention

According to one aspect of the present invention, by installing multiple low-output nuclear reactors in the required number according to the power demand and connecting the thermal energy extracted from the multiple reactors to a single steam generator, it is possible to generate electricity according to the power demand, thereby improving efficiency.

Description of Embodiments

Figure 1:
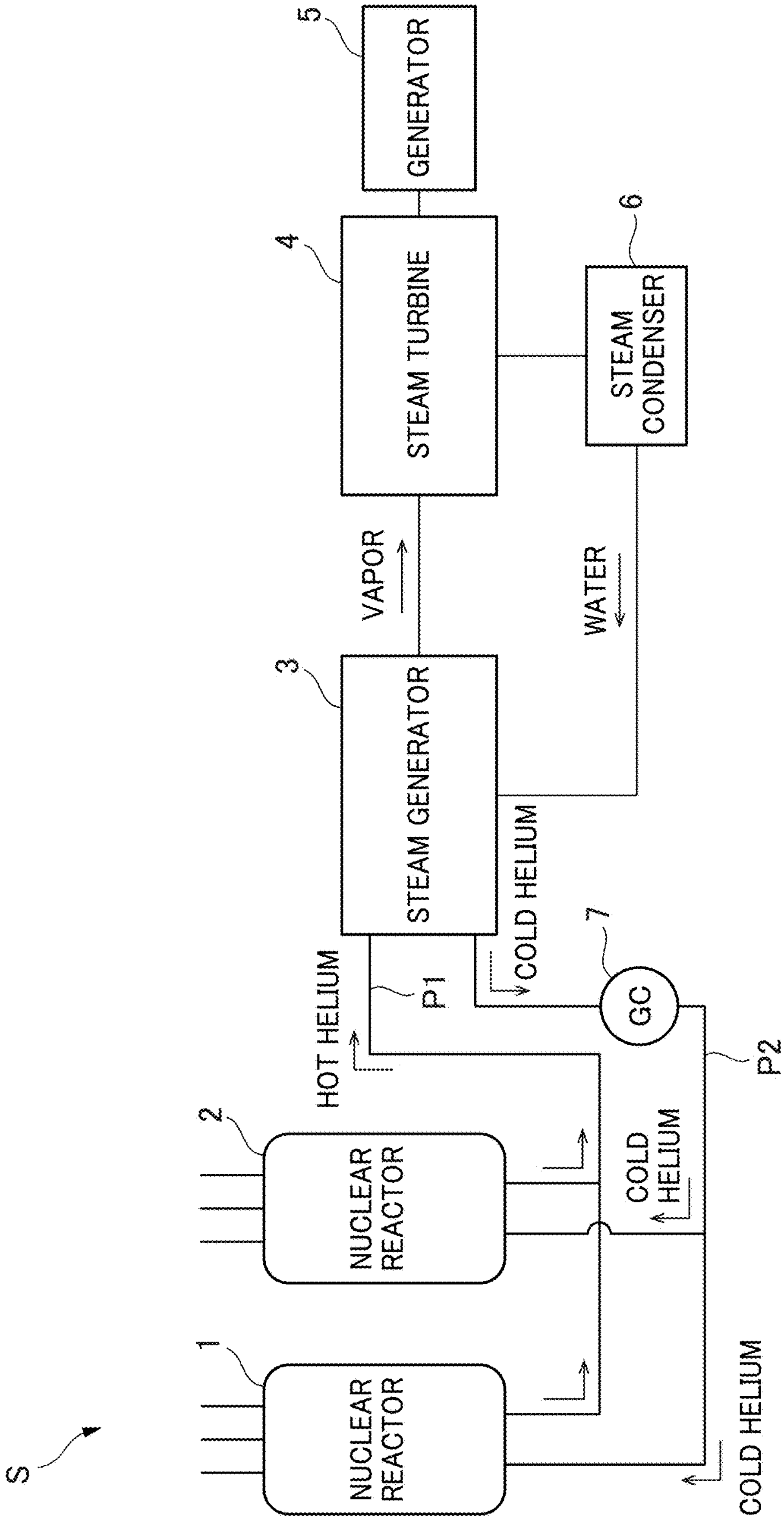
FIG. 1 is a schematic diagram showing an example of a nuclear reactor system according to an embodiment of the present invention.

Hereinafter, each embodiment will be described with reference to the drawings. However, overly detailed explanations may be omitted. For example, the detailed explanation of well-known matters or redundant explanations of substantially identical configurations may be omitted. This is to avoid making the following descriptions unnecessarily verbose and to facilitate the understanding of those skilled in the art.

Since the development of nuclear reactors is costly, when a new nuclear power plant is installed, the most recently developed nuclear reactor is typically selected. As a result, nuclear reactors are not chosen based on the power output required to meet local electricity demand. This leads to the inefficiency of having to install the maximum capacity nuclear reactors available, even in regions where the electricity demand is not particularly high.

In this embodiment, to address this issue, small-output nuclear reactors are installed in the necessary number according to the demands of the local power grid. Additionally, by using a single or minimal number of steam generators that produce steam from the thermal energy extracted from the nuclear reactors, a single or minimal number of steam turbines that convert the steam into mechanical power, and a single or minimal number of generators that convert the power into electricity, efficiency is improved, and the issue is resolved. Furthermore, by connecting multiple nuclear reactors to a single steam generator and a steam turbine using branch piping (e.g., T-shaped piping), the amount of equipment incorporated into the nuclear reactor system be reduced as much as possible in a rational manner, thereby reducing manufacturing and construction costs.

In addition to the above-mentioned issues, a second issue is that in the reactor system according to this embodiment, multiple reactor pressure vessels which become hot are installed, which causes large stresses (e.g., thermal stresses or loads due to earthquakes, etc.) in the nozzles to which the piping connecting the reactor pressure vessels and the steam generators is attached, which may result in damage to the equipment.

To address this second issue, in order to absorb the thermal displacement of the nuclear reactor pressure vessel, which becomes very hot, the reactor and/or steam generator are fitted with a structure (e.g., a free ball bearing) that allows them to move horizontally in response to thermal expansion, thereby supporting the vertical load while not restricting horizontal displacement.

In addition to the above issues, adding new equipment to improve safety poses another issue in that it worsens economic efficiency and increases operational complexity, raising concerns about new accidents, etc.

To address this issue, in order to improve the safety of nuclear reactors without using additional equipment, heat dissipation via equipment that purifies the coolant helium during normal operation can be used as a cooling system in the event of an accident, thereby solving the issues of reduced economic efficiency and complicated operations.

FIG. 1 is a schematic diagram showing an example of a nuclear reactor system according to the present embodiment. As shown in FIG. 1, the nuclear reactor system S includes a nuclear reactor 1, a nuclear reactor 2, a steam generator 3 to which the nuclear reactor 1 and the nuclear reactor 2 are connected via a first pipe P1 and a second pipe P2, a steam turbine 4 communicating with the steam generator 3, a generator 5 connected to the steam turbine 4, a steam condenser 6 communicating with the steam turbine 4, and a gas circulator (GC) 7 that circulates a coolant (e.g., low-temperature helium). The steam generator 3 generates steam from the thermal energy extracted from the nuclear reactor. The steam turbine 4 converts the energy of the steam into rotational energy. The generator 5 converts this rotational energy into electricity.

According to one embodiment, high-temperature helium produced in the reactors 1 and 2 using heat generated by nuclear fission of uranium in the nuclear reactors 1 and 2 is sent to the steam generator 3 via the first pipe P1. The steam generator 3 uses the high-temperature helium to turn water into steam, and the power of the steam is used to rotate the steam turbine 4, which generates electricity in the generator 5 connected thereto.

The steam that has finished turning the steam turbine 4 is cooled back into water in the steam condenser 6 and sent to the steam generator 3. When high-temperature helium converts water to steam in the steam generator 3, it becomes low-temperature helium whose temperature is reduced, and this low-temperature helium is sent by the circulator 7 to the reactors 1 and 2 via the second piping P2.

Nuclear reactor 1 and nuclear reactor 2 use coated fuel particles, a moderator (e.g., graphite), and a coolant (e.g., helium gas). The moderator slows down the high-speed neutrons generated by nuclear fission in the nuclear reactor, making them more effective to further nuclear fission. For example, graphite, which does not easily absorb neutrons, is used as a moderator. On the other hand, the coolant is used to extract the heat generated inside the reactor.

In one example, nuclear reactor 1 and nuclear reactor 2 are one of gas-cooled reactors and are high-temperature gas-cooled reactors, this high-temperature gas reactor is, for example, a nuclear reactor that uses graphite as a moderator and helium as a coolant. Due to the high core temperatures, the coated fuel particles are coated, for example, with a ceramic material.

The nuclear reactors 1 and 2 are not limited to the gas-cooled reactors described above, but may be water-cooled reactors, liquid metal-cooled reactors, or molten salt reactors. Water-cooled reactors include light water-cooled reactors and heavy water-cooled reactors. In the case of light water-cooled reactors, light water (ordinary water) may be used both as a moderator and a coolant.

Figure 2:
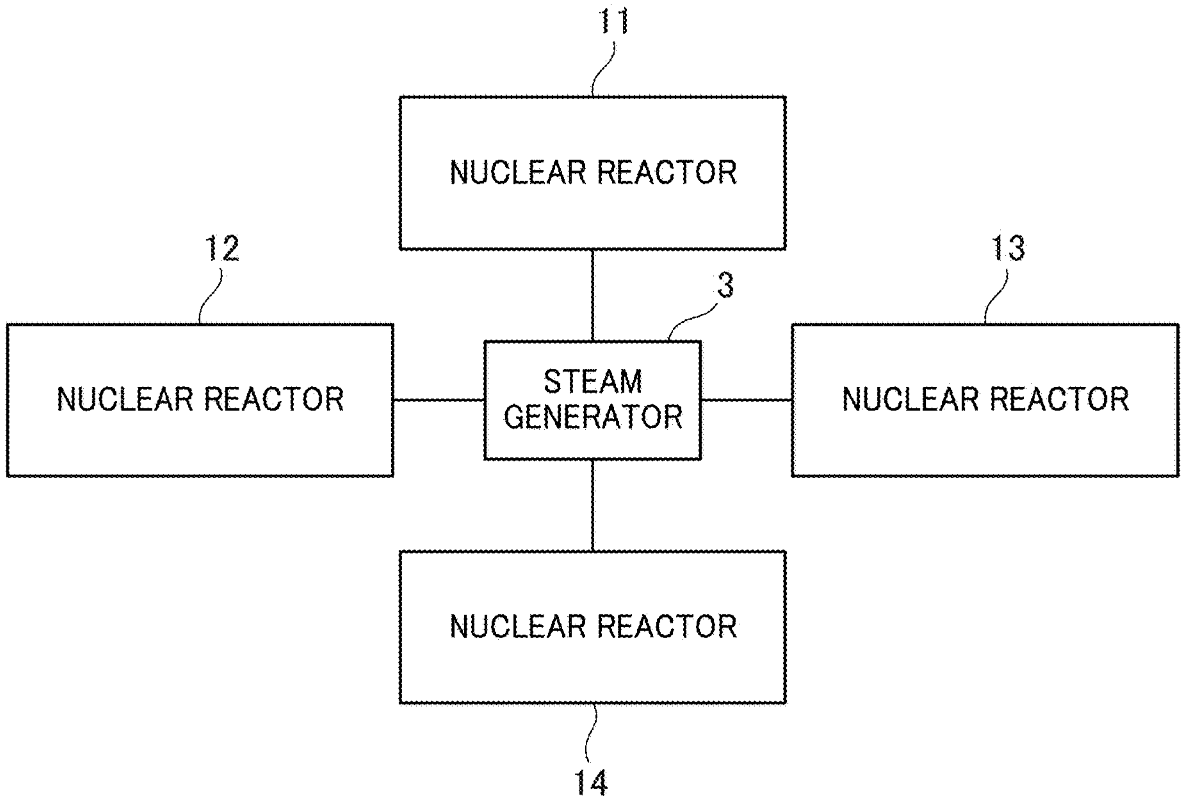
FIG. 2 is a schematic diagram showing an example of a connection mode between a steam generator and a nuclear reactor in a nuclear reactor system according to another first aspect of this embodiment.

FIG. 2 is a schematic diagram showing an example of a connection mode between a steam generator and a nuclear reactor in a nuclear reactor system according to another first aspect of this embodiment. As shown in FIG. 2, pipes may extend horizontally radially from the steam generator 3 (specifically, for example, multiple nozzles of the steam generator 3), and the nuclear reactors 11, 12, 13, and 14 may be connected to the ends of the pipes.

This allows the output to be adjusted. In addition, each of the reactors 11, 12, 13, and 14 may be connected to the steam generator 3 by a double pipe as described below.

Figure 3A:
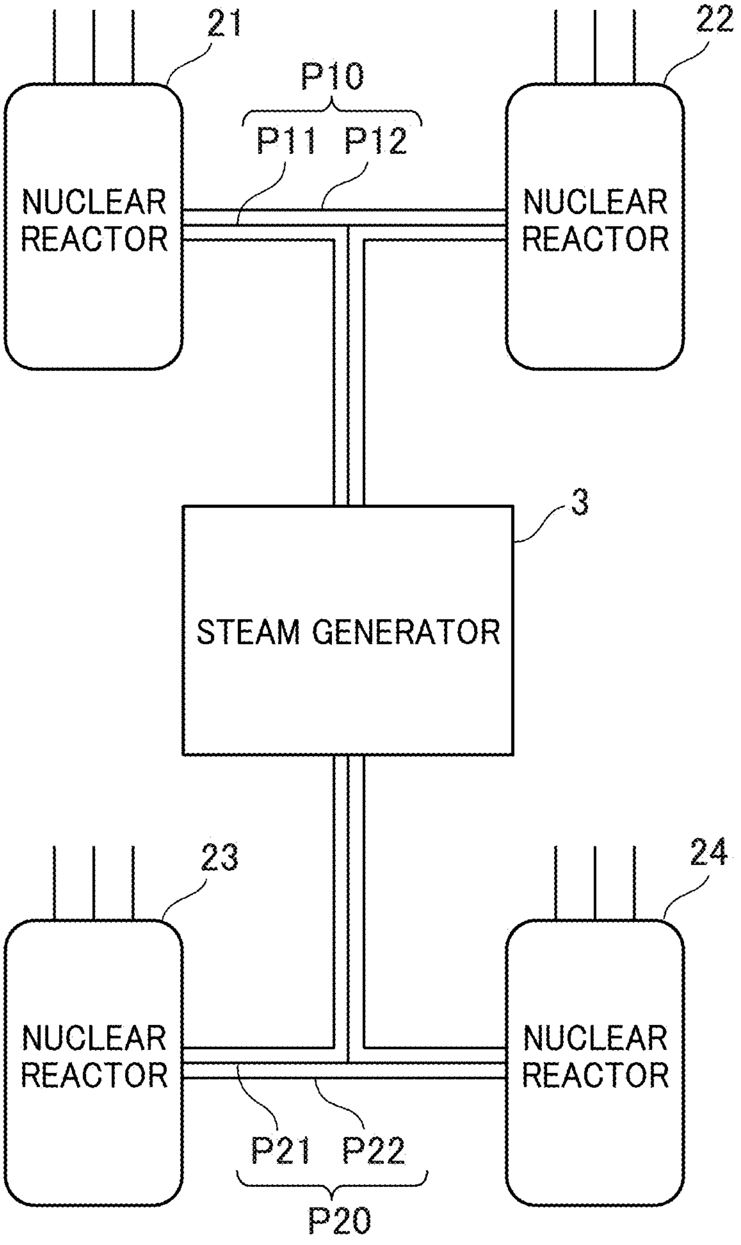
FIG. 3A is a schematic diagram showing an example of a connection mode between a steam generator and a nuclear reactor in a nuclear reactor system according to another second aspect of this embodiment.
Figure 3B:
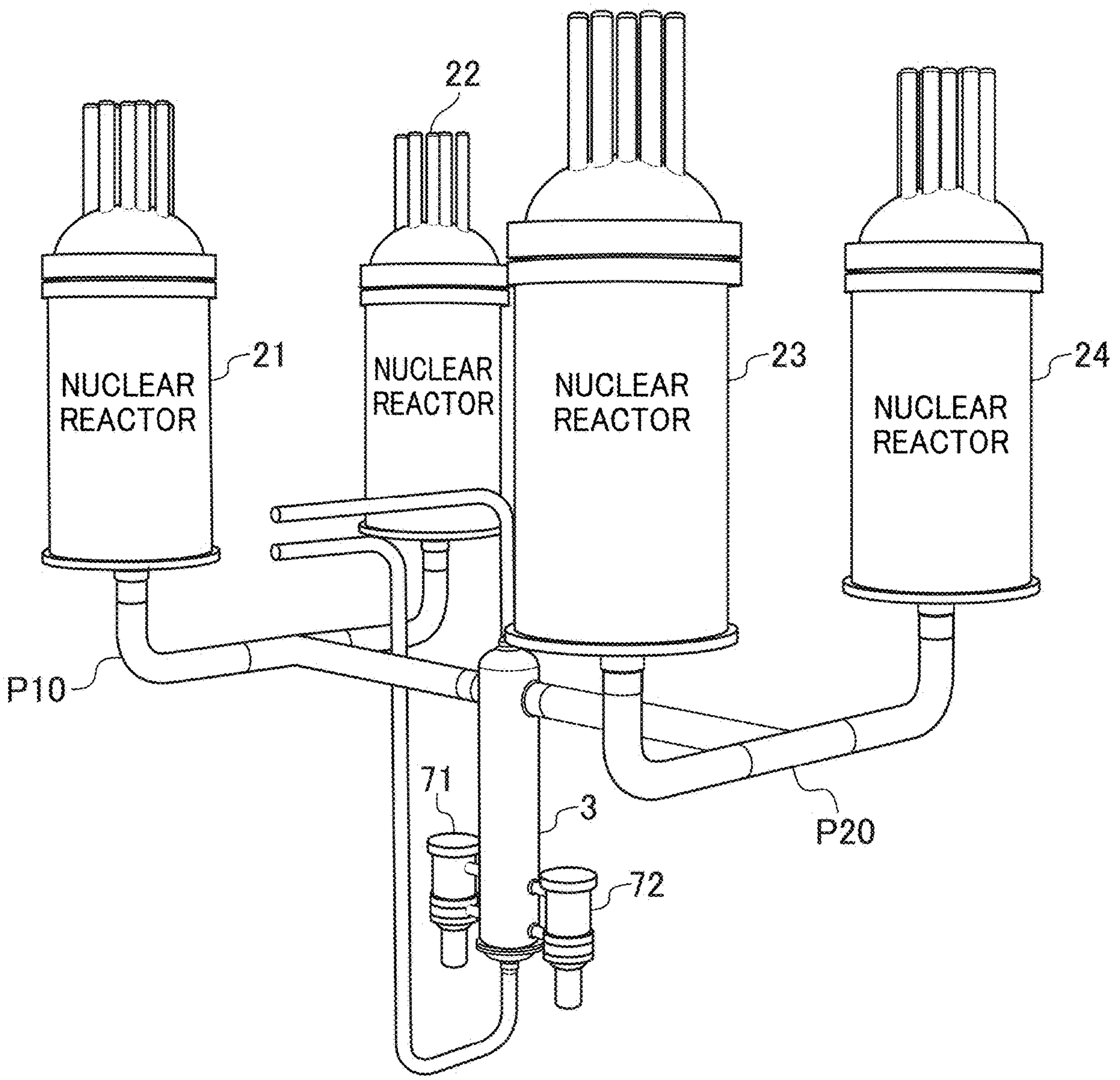
FIG. 3B is a perspective view showing an example of the configuration of a nuclear reactor system according to another second aspect of the present embodiment.
Figure 3C:
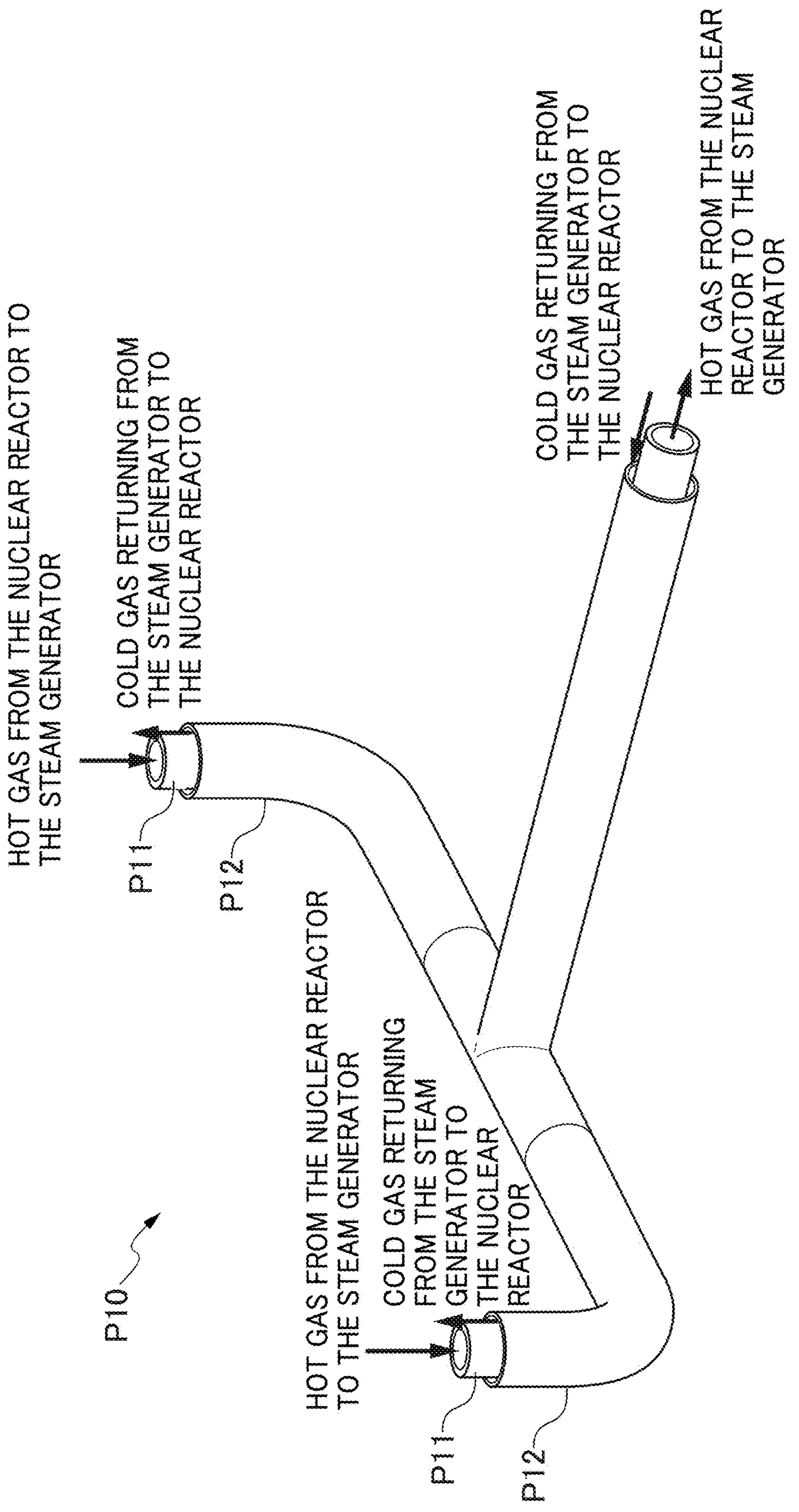
FIG. 3C is a perspective view showing an example of a double pipe configuration of the present embodiment.

FIG. 3A is a schematic diagram showing an example of a connection mode between a steam generator and a nuclear reactor in a nuclear reactor system according to another second aspect of this embodiment. FIG. 3B is a perspective view showing an example of the configuration of a nuclear reactor system according to another second aspect of the present embodiment. FIG. 3C is a perspective view showing an example of a double pipe configuration of the present embodiment. As shown in FIGS. 3A and 3B, a double pipe P10 extending from the steam generator 3 (specifically, for example, a nozzle of the steam generator 3) branches off midway, and each of the branches is connected to one nuclear reactor (for example, the underside of the reactor as shown in FIG. 3B), so that two nuclear reactors 21 and 22 are connected to one steam generator 3. As shown in FIGS. 3A and 3C, the double pipe P10 is composed of an inner pipe P11 and an outer pipe P12 that covers the inner pipe P11 at intervals in the circumferential direction. As shown in FIG. 3C, high-temperature gas from the nuclear reactors 21 and 22 to the steam generator 3 passes through the inner pipe P11. On the other hand, low-temperature gas returning from the steam generator 3 to the nuclear reactors 21 and 22 passes through the outer pipe P12.

Similarly, as shown in FIGS. 3A and 3B, a double pipe P20 extending from the steam generator 3 (specifically, for example, a nozzle of the steam generator 3) branches off along the way, and each of the branches is connected to one nuclear reactor (for example, the underside of the nuclear reactor as shown in FIG. 3B), thereby connecting two reactors 23, 24 to one steam generator 3. The double pipe P20 is composed of an inner pipe P21 and an outer pipe P22 that covers the inner pipe P21 at intervals in the circumferential direction. High-temperature gas from the reactors 23, 24 to the steam generator 3 passes through the inner pipe P21. On the other hand, low-temperature gas returning from the steam generator 3 to the nuclear reactors 23, 24 passes through the outer pipe 22.

As shown in FIG. 3B, gas circulators (GC) 71 and 72 that circulate a coolant (e.g., low-temperature helium) are provided and connected to the steam generator 3. The circulators 71 and 72 circulate the coolant between the reactors 21 to 24 and the steam generator 3. By installing multiple circulators, even if one is stopped for maintenance, the remaining circulators can be operated to keep the reactors running, improving economy.

By combining one or more of such embodiments in which two nuclear reactors are connected to one steam generator by means of branch piping (for example, T-shaped piping), it becomes possible to efficiently increase output.

The nozzles, which are the parts connecting the piping and the nozzle stand installed in the steam generator 3, experience high stress (e.g. thermal stress or loads from earthquakes, etc.), but the problem is that increasing the number of nozzles increases stress accordingly. In response to this, as described above, by connecting two nuclear reactors to one steam generator using branch piping (e.g., T-shaped piping), it is possible to reduce the number of nozzles relatively while increasing the number of connected nuclear reactors, thereby suppressing the increase in stress.

Figure 4:
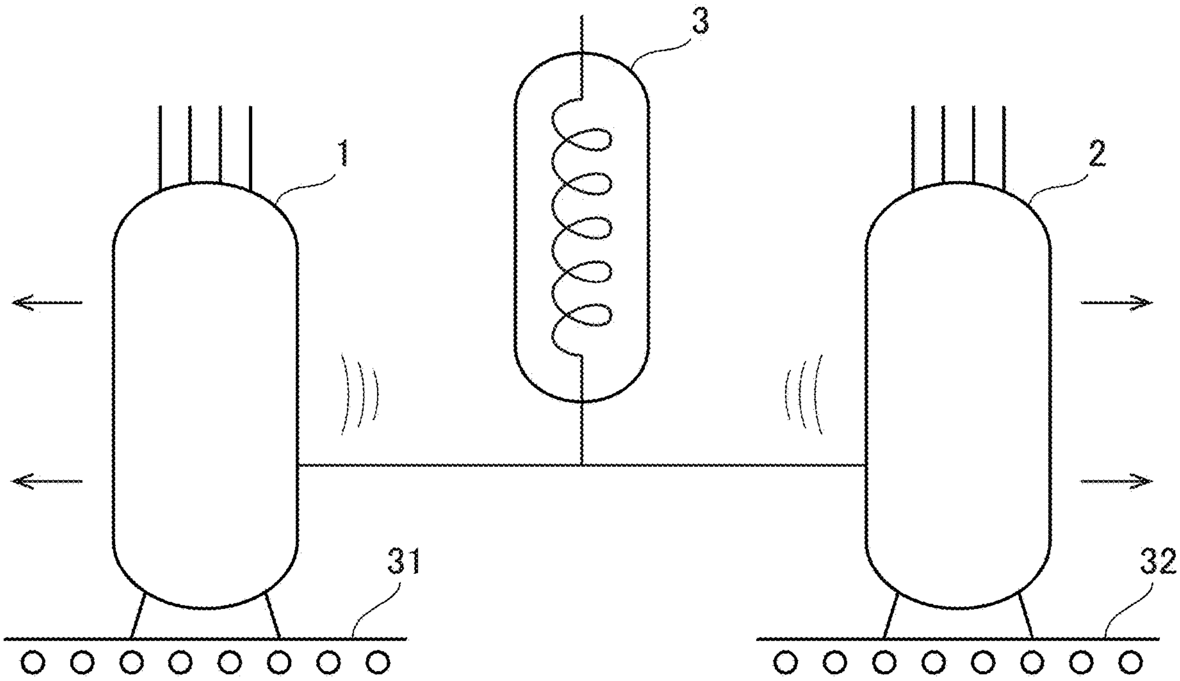
FIG. 4 is a schematic diagram showing an example of a support mode of a nuclear reactor in the nuclear reactor system of the present embodiment.

FIG. 4 is a schematic diagram showing an example of a support mode of a nuclear reactor in the nuclear reactor system of the present embodiment. As shown in FIG. 4, the nuclear reactor 1 is supported, for example, from below by a free ball bearing 31, which is an example of a structure that allows thermal expansion in the horizontal direction. Similarly, nuclear reactor 2 is supported from below, for example, by free ball bearings 32, which are an example of a structure that allows for horizontal thermal expansion. As a result, even if nuclear reactors 1 and 2 thermally expand horizontally, the stress that occurs can be alleviated by allowing the horizontal thermal expansion.

In the example of FIG. 4, the nuclear reactors 1 and 2 are supported from below by free ball bearings 31 and 32, but this is not limited to the above, and in addition or instead, the steam generator 3 may be supported from below by a free ball bearing. On the other hand, the free ball bearings are not limited to being installed on the lower side (building side) of the nuclear reactor, and instead or in addition, they may be installed on the upper side (equipment side) of the nuclear reactor. In this way, all or either of the reactor and steam generator are supported by a structure (e.g., a free ball bearing) that allows for horizontal thermal expansion.

Figure 5:
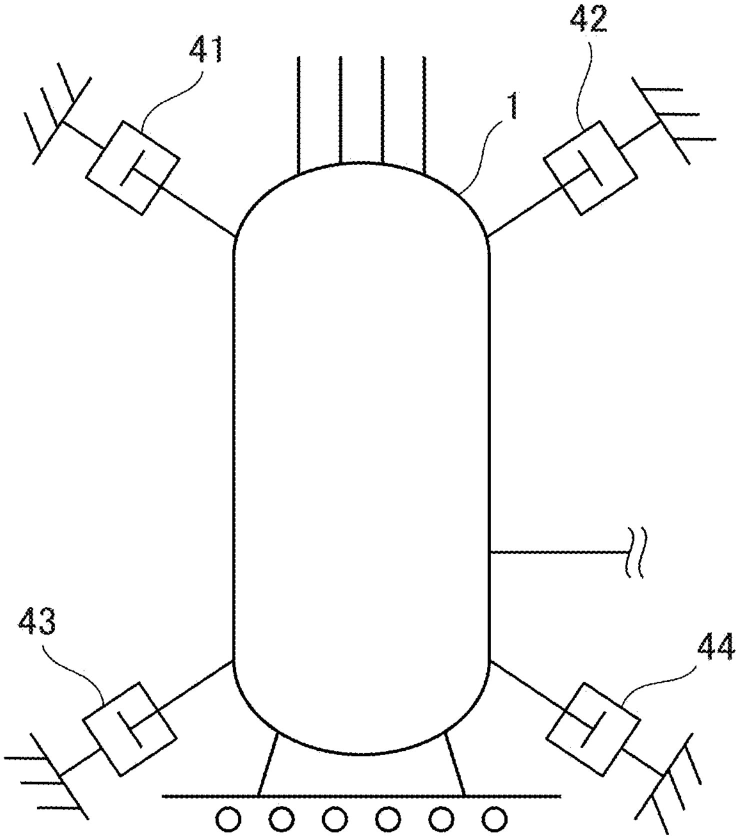
FIG. 5 is a schematic diagram showing an example of a method for fixing a nuclear reactor.

FIG. 5 is a schematic diagram showing an example of a method for fixing a nuclear reactor. As shown in FIG. 5, as an example, the reactor 1 is fixed to a building or structure via dampers 41, 42, 43, and 44. Here, the dampers 41, 42, 43, and 44 are an example of a support structure that suppresses shaking due to excitation during an earthquake. As a result, the dampers 41, 42, 43, and 44 absorb shaking due to excitation during an earthquake, so that the shaking of the reactor 1 can be suppressed.

Note that, although an example has been described in which the reactor is supported by a support structure (e.g., a damper) that suppresses shaking due to excitation during an earthquake, in addition to or instead of this, the steam generator may be supported by a support structure (e.g., a damper) that suppresses shaking due to excitation during an earthquake. In this way, the reactor and/or the steam generator may be supported by a support structure that suppresses shaking due to excitation during an earthquake.

Figure 6:
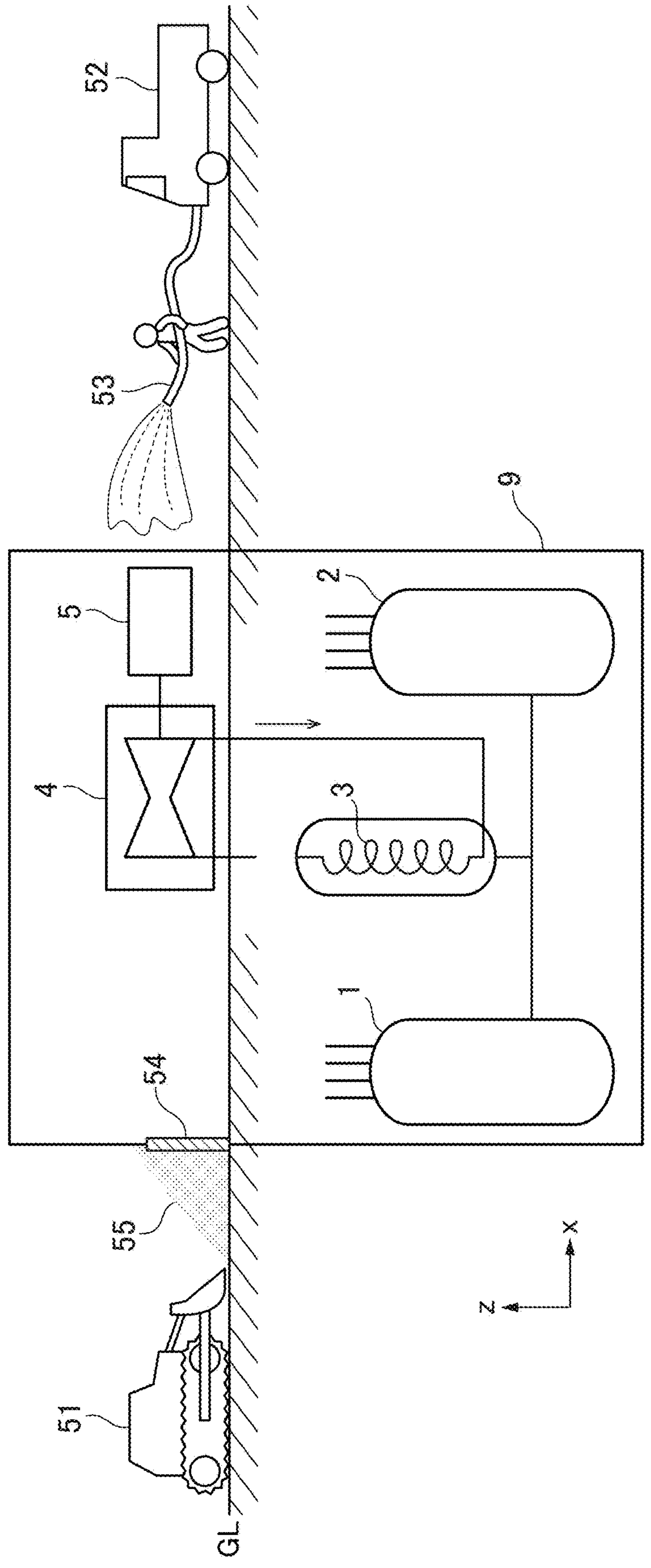
FIG. 6 is a schematic diagram showing an installation example of components of a nuclear reactor system.

The reactors 1 and 2 and the steam generator 3 may be arranged on a first floor (also called a lower floor), and the steam turbine 4 may be arranged on a second floor (also called an upper floor) above the first floor. As one installation mode, an installation example in which the upper floor is above ground and the lower floor is underground will be described with reference to FIG. 6. FIG. 6 is a schematic diagram showing an installation example of components of a nuclear reactor system. In FIG. 6, the x-axis represents the horizontal direction, the z-axis represents the height direction, and the ground level (GL), which is a line on the ground surface, is shown. The nuclear reactors 1 and 2, the steam generator 3, the steam turbine 4, and the generator 5 are provided in a reactor building 9. The nuclear reactors 1 and 2 and the steam generator 3 are arranged underground, and the steam turbine 4 and the generator 5 are arranged above ground.

Here, in the event of an abnormality such as an earthquake, cracks may form in components such as door 54 of reactor building 9, forming openings (not shown). By locating nuclear reactors 1, 2 and steam generator 3 underground, openings in door 54, etc. can be shielded with surrounding soil 55 using construction machinery such as bulldozer 51, making it easier to prevent radioactive materials from spreading in the event of an accident or abnormality.

In an emergency, the spread of radioactive materials can be easily suppressed by discharging water from a nozzle 53 of a hose connected to a tank of a fire engine or the like 52 capable of discharging water.

In the above example, the first floor (lower floor) is described as being underground, but this is not limited thereto, and the first floor (lower floor) or the second floor (upper floor) may be semi-underground.

Figure 7:
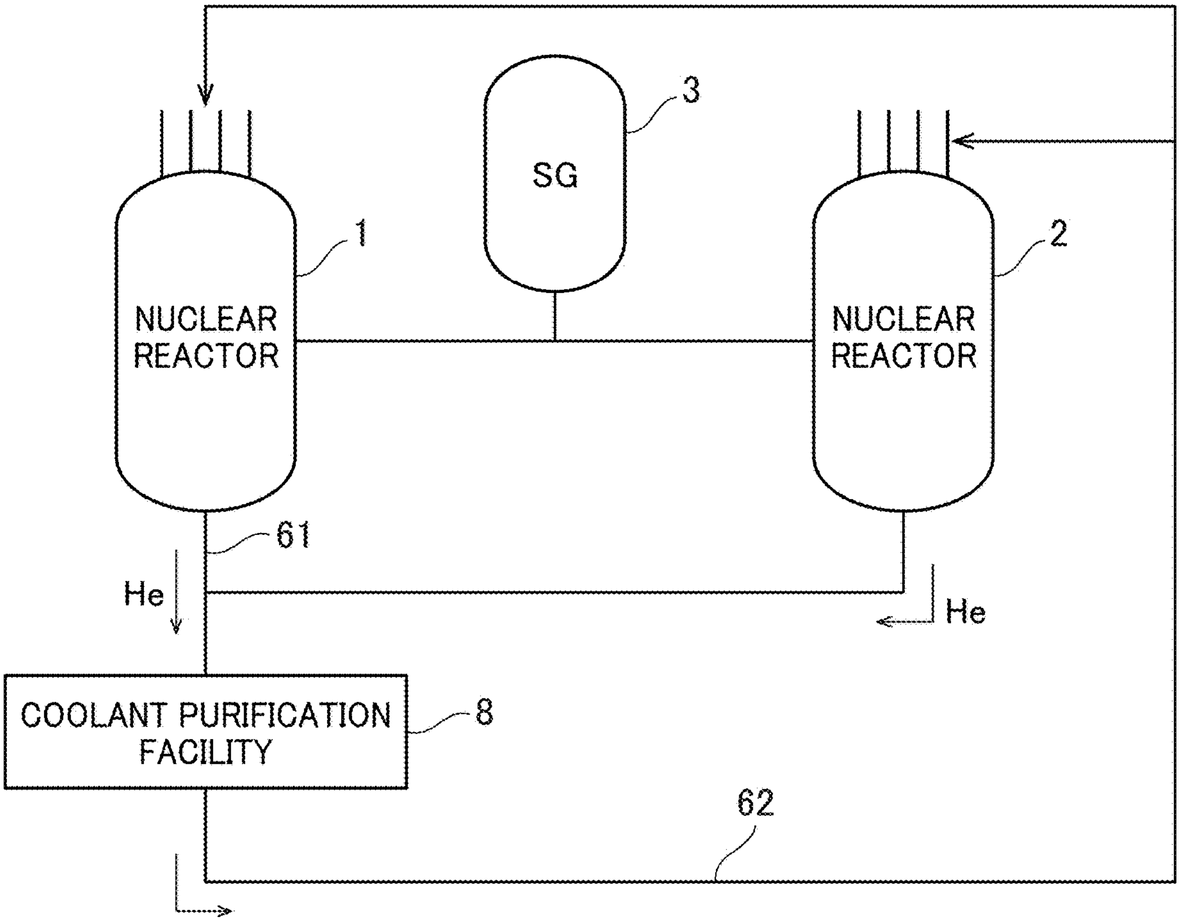
FIG. 7 is a schematic diagram illustrating an example of a cooling mechanism.

FIG. 7 is a schematic diagram illustrating an example of a cooling mechanism. As shown in FIG. 7, the nuclear reactor system S may further include a coolant purification facility 8 that purifies the coolant (e.g., helium) and cools the coolant, a suction pipe 61 that connects the reactors 1, 2 to the suction ports of the coolant purification facility 8, and a discharge pipe 62 that connects the reactors 1, 2 to the discharge ports of the coolant purification facility 8. In this case, if the nuclear reactors 1, 2 cannot be cooled normally, the coolant (e.g., helium) is cooled through the coolant purification facility 8, and the cooled coolant is supplied again to the nuclear reactors 1, 2.

As a result, the coolant is cooled in the coolant purification facility 8 and in the suction pipe 61 and discharge pipe 62, so that the coolant can be cooled and a cooling function can also be provided in the event of an abnormality.

As described above, the nuclear reactor system S of this embodiment comprises multiple nuclear reactors that use coated fuel particles, a moderator and a coolant, a steam generator 3 that generates steam from thermal energy extracted from the reactors, and a steam turbine 4 that is connected to the steam generator and converts the energy of the steam into rotational energy, wherein multiple nuclear reactors are connected to one steam generator 3.

With this configuration, the nuclear reactors can be made smaller and multiple nuclear reactors can be installed in the number required to meet electricity demand and the thermal energy extracted from the multiple reactors can be connected to a single steam generator, making it possible to generate electricity in response to electricity demand and improving efficiency.

As described above, the present invention is not limited to the above-described embodiment as it is, and in the implementation stage, the components can be modified and embodied without departing from the gist of the invention. In addition, various inventions can be formed by appropriately combining the multiple components disclosed in the above-described embodiment. For example, some components may be deleted from all the components shown in the embodiment. Furthermore, components from different embodiments may be appropriately combined.

REFERENCE SIGNS LIST

1, 11, 2, 21, 23, 25, 27 nuclear reactor
3 steam generator
31, 32 free ball bearing
4 steam turbine
41 damper
5 generator
51 bulldozer
52 drainage vehicle
53 nozzle
6 steam condenser
61 suction pipe
62 discharge pipe
7 circulator
8 coolant purification facility
S nuclear reactor system

What is claimed is:

1. A nuclear reactor system comprising:

a plurality of nuclear reactors, wherein each of the plurality of nuclear reactors comprises coated fuel particles, a moderator and a coolant gas, and the plurality of nuclear reactors are connected to only one steam generator, wherein the steam generator is configured to generate steam from thermal energy extracted from the nuclear reactors; and a steam turbine that is connected to the steam generator and configured to convert the energy of the steam into rotational energy, wherein:

a number of the plurality of nuclear reactors is an even number, and each of the nuclear reactors included in the plurality of nuclear reactors is connected to a respective branch pipe, a pair of the branch pipes joining together to form a single double walled pipe, the single double walled pipe being connected to the steam generator via a single joint, the single double walled pipe includes an inner tube and an outer tube surrounding the inner tube with a radial spacing, and the coolant gas is configured to flow from each of the nuclear reactors connected to the pair of branch pipes to the steam generator through the inner tube of the single double walled pipe and the pair of branch pipes, and the coolant gas is configured to flow from the steam generator to each of the nuclear reactors connected to the pair of branch pipes through the outer tube of the single double walled pipe, and all or any of the nuclear reactors is supported from below by a structure that allows for horizontal thermal expansion.

2. The nuclear reactor system according to claim 1,
wherein the single double walled pipe extends horizontally radially from the steam generator.

3. The nuclear reactor system according to claim 1,
wherein the structure that allows for horizontal thermal expansion is a free ball bearing.

4. The nuclear reactor system according to claim 1,
wherein at least one of the plurality of nuclear reactors is supported by a second support structure that suppresses vibrations caused by earthquakes.

5. The nuclear reactor system according to claim 4,
wherein the second support structure is a damper.

6. The nuclear reactor system according to claim 1,
wherein the plurality of nuclear reactors and the steam generator are disposed on a first floor, and the steam turbine is disposed on a second floor above the first floor.

7. The nuclear reactor system according to claim 1, further comprising:

a coolant purification facility that purifies the coolant gas and cools it;

a suction pipe that connects the plurality of reactors to a suction port of the coolant purification facility; and a discharge pipe that connects the plurality of reactors to a discharge port of the coolant purification facility, wherein, if the reactors cannot be cooled to a predetermined standard, the coolant gas is cooled through the coolant purification facility, and the cooled coolant gas is supplied again to the reactors.

8. The nuclear reactor system according to claim 1,
wherein the plurality of nuclear reactors are gas-cooled reactors.

* * * * *